United States Patent [19]

Mitsuji et al.

[11] Patent Number: 5,281,655
[45] Date of Patent: Jan. 25, 1994

[54] AQUEOUS COATING COMPOSITION AND COATING METHOD WITH USE OF THE COMPOSITION

[75] Inventors: Masaru Mitsuji, Zama; Mitsugu Endo, Kanagawa; Junichi Kajima, Hiratsuka; Yasuo Takaya, Kanagawa, all of Japan

[73] Assignee: Kansai Paint Company, Limited, Amagasaki, Japan

[21] Appl. No.: 916,686

[22] Filed: Jul. 22, 1992

Related U.S. Application Data

[62] Division of Ser. No. 747,837, Aug. 21, 1991.

[30] Foreign Application Priority Data

Aug. 22, 1990 [JP] Japan ................................ 2-222015

[51] Int. Cl.$^5$ ............................................. C08L 75/04
[52] U.S. Cl. ..................................... 524/507; 524/591
[58] Field of Search ....................... 524/507, 597, 457

[56] References Cited

U.S. PATENT DOCUMENTS 4,948,829  8/1990  Mitsuji et al. ...................... 524/507
5,011,881  4/1991  Fujii et al. ........................... 524/507

*Primary Examiner*—Joseph L. Schofer
*Assistant Examiner*—Jeffrey T. Smith
*Attorney, Agent, or Firm*—Armstrong, Westerman, Hattori, McLeland & Naughton

[57] ABSTRACT

Disclosed is an aqueous coating composition characterized in that the composition consists essentially of:
(A) a resin for use in aqueous coating compositions,
(B) a urethane resin emulsion, and
(C) crosslinking agent,
the component (B) being an aqueous dispersion of a polyurethane resin prepared by reacting (a) an aliphatic polyisocyanate and/or an alicyclic polyisocyanate, (b) a high-molecular-weight polyol, (c) an α,α-dimethylolmonocarboxylic acid, and when required, (d) a chain lengthening agent and/or a polymerization terminator, and subsequently neutralizing the carboxyl with (e) a primary monoamine and/or a secondary monoamine.

2 Claims, No Drawings

AQUEOUS COATING COMPOSITION AND COATING METHOD WITH USE OF THE COMPOSITION

This is a division, of prior application Ser. No. 747,837 filed Aug. 21, 1991, now pending.

The present invention relates to a novel aqueous coating composition and a coating method with use of the composition.

It is already known to form overcoats by the two-coat one-bake method using an aqueous base coating composition and a clear coating composition of the organic solvent type. The aqueous base coating composition to be used is a composition consisting essentially of an acrylic resin emulsion, a urethane resin emulsion neutralized with a tertiary amine and a crosslinking agent (Unexamined Japanese Patent Publication HEI 1-287183).

The aqueous coating composition, when used, forms overcoats which are excellent in distinctness-of-image gloss, smoothness, weather resistance, etc. and which have improved resistance to chipping. However, if the clear coating composition used is a thermosetting composition of high solids content containing an acid catalyst, the clear coating formed is not curable sufficiently. This results in the drawback that the overcoat is low in resistance to weather, solvents and water and in interlayer adhesion and exhibits an impaired appearance on finishing with respect to distinctness-of-image gloss and smoothness.

When examined, these faults are found attributable to the phenomenon that the tertiary amine which is present in the aqueous base coating composition to serve as the neutralizing agent bleeds into the clear coating. Accordingly, it may be attempted to dry the coating of the aqueous composition by heating before the application of the clear composition to vaporize the tertiary amine, whereas the amine, which forms a salt with the carboxyl of the resin, remains in the coating. Thus, the problem remains unsolved.

The thermosetting composition of high solids content used as the clear coating composition in the two-coat one-bake method, as well as the aqueous base coating composition, serves to control air pollution and to ensure savings in resources. It is therefore important for industries to obtain aqueous coating compositions which are satisfactorily usable in combination with the thermosetting coating composition of high solids content.

An object of the present invention is to provide an aqueous base coating composition which is satisfactorily usable along with thermosetting coating compositions of high solids content.

Another object of the present invention is to provide a coating method with use of the aqueous base coating composition.

Other features of the present invention will become apparent from the following description.

The present invention provides an aqueous coating composition which consists essentially of:
(A) a resin for use in aqueous coating compositions,
(B) a urethane resin emulsion, and
(C) crosslinking agent,
the component (B) being an aqueous dispersion of a polyurethane resin prepared by reacting (a) an aliphatic polyisocyanate and/or an alicyclic polyisocyanate, (b) a high-molecular-weight polyol, (c) an α,α-dimethylolmonocarboxylic acid, and when required, (d) a chain lengthening agent and/or a polymerization terminator, and subsequently neutralizing the carboxyl with (e) a primary monoamine and/or a secondary monoamine.

The present invention also provides a two-coat one-bake coating method comprising coating a substrate with a base coating composition comprising a coloring pigment and/or a metallic pigment, applying a clear coating composition to the resulting coating without curing the coating to form a transparent coating thereon, and thereafter heating the two coatings for curing, the coating method being characterized in that the above aqueous coating composition is used as the base coating composition.

First, the aqueous coating composition of the invention will be described.

Component (A): Resin For Use in Aqueous Coating Compositions

This resin is the basic component of the cured coating to be obtained. Examples of useful resins are acrylic resins, alkyd resins (polyester-containing resins, the same as hereinafter), epoxy resins, fluorine-containing resins and the like, as rendered soluble in water or dispersible in water. Preferably such resins are those having hydroxyl or carboxyl in the molecular structure. Among the examples given, acrylic resins are preferred. Acrylic resins a) to d) are described below in detail for use in the present invention.

a) Water-Soluble Acrylic Resins

Useful examples are neutralized products of acrylic resins which are prepared by copolymerizing a carboxyl-containing vinyl monomer (M-1), a hydroxyl-containing vinyl monomer (M-2) and other vinyl monomer (M-3), and having an acid value of about 20 to about 150, a hydroxyl value of about 20 to about 200 and a number average molecular weight of about 3,000 to about 100,000.

The carboxyl-containing vinyl monomer (M-1) is a compound having at least one carboxyl group and one polymorizable unsaturated bond in the molecule. Examples of such monomers are acrylic acid, methacrylic acid, crotonic acid, maleic acid, itaconic acid and the like.

The hydroxyl-containing vinyl monomer (M-2) is a compound having one hydroxyl group and one polymerizable unsaturated bond in the molecule. The hydroxyl group primarily acts as a functional group reactive with crosslinking agents. Preferably, the monomer is a monoester of acrylic acid or methacrylic acid with a dihydric alcohol having 2 to 10 carbon atoms. Examples of such monoesters are 2-hydroxyethyl acrylate, 2-hydroxyethyl methacrylate, hydroxypropyl acrylate, hydroxypropyl methacrylate and the like.

Other vinyl monomer (M-3) is a compound other than the monomers (M-1) and (M-2) and having one polymerizable unsaturated bond in the molecule. Compounds (1) to (8) are given below as examples of such compounds.

(1) Monoesters of acrylic acid or methacrylic acid with a monohydric alcohol having 1 to 20 carbon atoms, such as methyl acrylate, methyl methacrylate, ethyl acrylate, ethyl methacrylate, propyl acrylate, propyl methacrylate, butyl acrylate, butyl methacrylate, 2-ethylhexy) acrylate, 2-ethylhexyl methacrylate, cyclohexyl acrylate, cyclohexyl methacrylate, lauryl acrylate, lauryl methacrylate, etc.

(2) Aromatic vinyl monomers such as styrene, α-methylstyrene, vinyltoluene, etc.

(3) Glycidyl-containing vinyl monomers which are compounds having one glycidyl group and one polymerizable unsaturated bond in the molecule, such as glycidyl acrylate, glycidyl methacrylate and the like.

(4) Nitrogen-containing alkyl (having 1 to 20 carbon atoms) acrylates such as dimethylaminoethyl acrylate and dimethylaminoethyl methacrylate.

(5) Amide compounds having a polymerizable unsaturated bond, such as acrylic amide, methacrylic amide, dimethylacrylic amide, N,N-dimethylpropylacrylic amide, N-butoxymethylacrylic amide, N-methylolacrylic amide, N-methylolmethacrylic amide and diacetoneacrylic amide.

(6) Vinyl compounds such as vinyl acetate, vinyl propionate and vinyl chloride.

(7) Nitrile compounds containing a polymerizable unsaturated bond such as acrylonitrile and methacrylonitrile.

(8) Diene compounds such as butadiene and isoprene.

One or at least two of these other vinyl monomers (M-3) can be used.

The vinyl monomers (M-1) to (M-3) can be copolymerized by a known method. If less than about 20 in acid value, the acrylic resin obtained is difficult to dissolve in water, whereas if the acid value is over about 150, it is likely that the coating formed will have impaired properties due to the influence of the residual carboxyl.

It is desired that the acrylic resin thus obtained be neutralized with a primary monoamine and/or a secondary monoamine examples of such are mentioned below, and thereby made soluble in water.

b) Water-Dispersible Acrylic Resin-I

This resin is an acrylic resin in the form of fine particles of 0.05 to 1.0 μ in mean size and prepared by subjecting a vinyl monomer to emulsion polymerization in the presence of a surfactant or like dispersion stabilizer. The resin is used as dispersed in water.

The vinyl monomer to be subjected to emulsion polymerization is preferably one selected from among the monomer (M-1), monomer (M-2) and monomer (M-3) mentioned above. Further when required, a small amount of polyvinyl monomer (M-4) having at least two polymerizable unsaturated bonds in the molecule is used conjointly. A water-dispersible acrylic resin is then obtained which is crosslinked within particles. This resin is desirable since the coating obtained has improved properties.

Examples of useful polyvinyl compounds (M-4) are ethylene glycol diacrylate, ethylene glycol dimethacrylate, triethylene glycol diacrylate, tetraethylene glycol dimethacrylate, I,6-hexanediol diacrylate, divinylbenzene, trimethylolpropane triacrylate and the like. It is desired that the two or more unsaturated double bonds present in these compounds be not greatly different in reactivity. The above-mentioned diene compound (8) is not used when the compound (M-4) is used.

Preferably, the water-dispersible acrylic resin thus prepared is also neutralized with the primary and/or second monoamine(s) to be mentioned below.

c) Water-Dispersible Acrylic Resin-2

This resin is an acrylic resin in the form of fine particles dispersed in water and stabilized with a stabilizer polymer. The resin, i.e., the aqueous dispersion, is an emulsion of the core/shell type wherein the particles are cores, and the stabilizer polymer forms shells.

More specifically, this emulsion is prepared by subjecting a vinyl monomer completely or almost completely free from the carboxy-containing vinyl monomer (M-1) to emulsion polymerization first, thereafter adding a vinyl monomer containing the vinyl monomer (M-1) to the resulting polymer, and subjecting the mixture to emulsion polymerization. When neutralized with the primary and/or secondary monoamine(s) to be mentioned later, the emulsion is given an increased viscosity and is therefore desirable in view of coating efficiency.

d) Water-Dispersible Acrylic Resin-3

This resin is in the form of an emulsion of the core/shell type comprising crosslinked polymer particles (cores) and a polymer (shells) for stabilizing the particles, the core portion being chemically bonded to the shell portion.

The core portion is bonded to the shell portion preferably for causing the surface of the core portion to retain a hydrolyzable functional group or silanol group, then introducing a polymerizable unsaturated bond into the group, copolymerizing a vinyl monomer containing the carboxyl-containing vinyl monomer (M-1) with the unsaturated bond (to form the shell portion) and thereafter neutralizing the carboxyl groups of the shell portion.

Being thixotropic, the emulsion has the features of not permitting the coating to sag even under a high humidity, exibiting no change when incorporating an organic solvent added thereto and forming coatings which are excellent in smoothness, gloss, water resistance and adhesion.

This emulsion of the core/shell type is prepared by the following steps (I) to (III).

(I) A silane monomer (M-5) having hydrolyzable functional groups and/or silanol groups, and a polymerizable unsaturated bond, a hydroxyl-containing vinyl monomer (M-2) and a vinyl monomer (M-6) other than these monomers are reacted in an aqueous medium to prepare an emulsion comprising a three-dimensionally crosslinked polymer in the form of fine particles and dispersed in water. The fine particles form the core.

(II) Another portion of the silane monomer (M-5) and/or allyl (meth)acrylate (M-7) are/is reacted with the particulate polymer in the emulsion.

Presumably in the step (II), the silane monomer (M-5) undergoes a condensation reaction with the functional group on the surface of the particulate polymer, and the allyl (meth)acrylate (M-7) copolymerizes with the unreacted polymerizable unsaturated bond remaining in the particulate polymer. The polymerizable unsaturated bond can be introduced into the surface of the particulate polymer by either of these reactions.

(III) A vinyl monomer (M-8) containing a carboxyl-containing vinyl monomer (M-1) is copolymerized with the polymer within the emulsion resulting from the reaction of the step (II), followed by the neutralization of the carboxyl. The neutralized copolymer serves as the polymer for stabilizing the dispersion of the particulate polymer, and corresponds to the shell portion. In the step (III), the vinyl monomer (M-8) copolymerizes with the polymerizable unsaturated bonds derived from the silane monomer (M-5) and/or the allyl (meth)acrylate (M-7) and present on the surface of the particulate polymer resulting from the reaction of the step (II).

The silane monomer (M-5) for use in the step (I) is preferably a compound wherein three hydrolyzable functional groups and/or silanol groups, and a residue group having one polymerizable unsaturated bond are attached to Si in the molecule.

This compound is represented by the formula $(R_1)_3-Si-X$ (wherein $R_1$ is a hydrolyzable functional group and/or silanol group, and X is a residue group having polymerizable unsaturated bond). The silane monomer (M-5) primarily has the function of forming the core portion through internal crosslinking.

In the above formula, examples of hydrolyzable functional groups represented by $R_1$ are alkoxyl having 1 to 12 carbon atoms, alkoxyalkoxyl having 3 to 15 carbon atoms, and alkanoyloxy having 1 to 12 carbon atoms and examples of groups X are $CH_2=CH-$ and

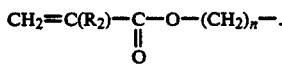

Exemplary of $R_2$ are H and $CH_3-$, and n is an integer of 2 to 10.

More specific examples of silane monomers (M-5) are vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane, vinyltris($\beta$-methoxyethoxy)silaneand the like. Among these, especially preferable are vinyltrimethoxysilane, $\gamma$-acryloxypropyltrimethoxysilaneand $\gamma$-methacryloxypropyltrimethoxysilane.

The hydroxyl-containing vinyl monomer (M-2) to be used in the step (I) is the one already mentioned. Exemplary of the "vinyl monomer (M-6) other than these monomers" are the aforementioned monomers (M-1) to (M-5) other than the monomers (M-5) and (M-2).

The step (I), i.e., the copolymerization of the silane monomer (M-5), hydroxyl-containing monomer (M-2) and other monomer (M-6) in an aqueous medium to obtain the three-dimensionally crosslinked particulate polymer, can be conducted by the following emulsion polymerization processes (i) to (iii) given below which are already known.

(i) A mixture of the monomers is slowly added dropwise to an aqueous medium, prepared by adding a surfactant to water, with stirring in an inert gas atmosphere to effect copolymerization at a predetermined temperature.

(ii) A mixture of the monomers is emulsified in an aqueous medium first, and the emulsion is slowly added dropwise to water to effect copolymerization at a predetermined temperature.

(iii) A small amount of one of the monomers or of a mixture thereof is subjected to seed polymerization first, and the polymer and the remaining portions of the monomers are then subjected to emulsion polymerization by the process (i) or (ii).

Among these processes, the process (iii) is preferable since the polymer then obtained is smaller in particle size and imparts improved resistance to sagging and smoothness to the coating obtained.

These emulsion polymerization processes are conducted preferably in the presence of a radical polymerization initiator.

The proportions of the monomers for use in the steps (I) and (III) will now be described. The preferred proportions of the combined amount of all the monomers in the step (I) and the amount of the monomer in the step (III) are 30 to 95 wt. %, especially 60 to the step 90 wt. % of the monomers of the step (I), and 70 to 5 wt. %, especially 40 to 10 wt. %, of the monomer of the step (III), based on the total of these amounts.

Further all the monomers used in the step (I) are the silane monomer (M-5), the hydroxyl-containing vinyl monomer (M-2) and the other vinyl monomer (M-6). Based on the combined amount of these monomers, it is preferable to use 0.5 to 20 wt. %, more preferably 1 to 10 wt. %, of the silane monomer (M-5), 1 to 30 wt. %, more preferably 2 to 20 wt. %, of the hydroxyl-containing vinyl monomer (M-2) and 98.5 to 5 wt. %, more preferably 97 to 70 wt. %, of the other vinyl monomer (M-6).

Further the monomer for use in the step (III) is the vinyl monomer (M-8) containing the carboxyl-containing vinyl monomer (M-1). Preferably, the monomer (M-8) contains 1 to 50 wt. %, more preferably 3 to 30 wt. %, of the monomer (M-1). The monomer (M-8) comprises the monomer (M-1), the hydroxyl-containing vinyl monomer (M-2) and at least one of the monomers (I) to (8) exemplified for the monomer (M-3). Preferably, the monomer (M-2) contains up to 30 wt. %, more preferably up to 25 wt. %, of the monomer (M-8).

The silane monomer (M-5) and polyvinyl compound (M-4) can be used in combination with the monomer (M-8), in an amount of up to 10 wt. % based on the monomer (M-8).

It is considered that the particulate polymer of the emulsion prepared by the step (I) is three-dimensionally crosslinked primarily owing to a carbon-carbon bond due to the polymerizable unsaturated bond and —SI—O—SI— bond due to the silane monomer (M-5). It appears that the surface of the particulate polymer has attached thereto unreacted hydrolyzable functional groups and/or silanol groups due to the silane monomer (M-5) Furthermore, hydroxyl groups due to the monomer (M-2) are also present on the surface. The particulate polymer obtained by the step (I) is preferably 10 to 500 nm, more preferably 30 to 300 nm, in particle size although the size differs depending on the kind and amount of surfactant used and the method of polymerization.

The step (II) serves to introduce the polymerizable unsaturated double bond into the surface of the particulate polymer. The polymer having the polymerizable unsaturated bond introduced therein and obtained by the step (II) will hereinafter be referred to briefly as "unsaturated particulate polymer."

Although the ratio of the silane monomer (M-5) to the particulate polymer in the step (II) is not limited specifically, it is desirable to use 0.5 to 2 moles of the silane monomer (M-5) in the step (II) per mole of the silane monomer (M-5) used in the step (I) (usually 5o to 200 parts by weight of the latter per 100 parts by weight of the former).

It is desirable to use the monomer (M-5) and the monomer (M-7) in combination, and these monomers can each be used in the same ratio as stated above.

In the step (III), the unsaturated particulate polymer obtained by the step (II) is copolymerized with the vinyl monomer (M-8) containing the carboxyl-containing vinyl monomer (M-1), and the carboxyl is then neutralized to form the shell portion.

In this step, the copolymer (corresponding to the shell portion) which is formed by the vinyl monomer (M-8) and which is predominantly linear is attached to the unsaturated particulate polymer (corresponding to the core portion) resulting from the step (II).

The step (III) also includes a procedure for copolymerizing the vinyl monomer (M-8) with the unsaturated particulate polymer to form a shell portion and further neutralizing the carboxyl in the shell portion. It is desirable to use the primary or secondary amine to be stated later as the neutralizing agent.

According to the present invention, it is most suitable to use the water-dispersible acrylic resin-3.
Component (B): urethane resin emulsion A first component (a) for forming the component (B) comprises an aliphatic polyisocyanate and/or an aliphatic polyisocyanate. The aliphatic or alicyclic polyisocyanate is a compound having at least two isocyanate groups, and an aliphatic carbon group or alicyclic carbon group in the molecule. Examples of such compounds are aliphatic diisocyanates having 2 to 12 carbon atoms, such as hexamethylene diisocyanate (HDI), 2,2,4-trimethyl-hexane diisocyanate and lisine diisocyanate; alicyclic diisocyanates having 4 to 18 carbon atoms, such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidenedicyclohexyl-4,4'-diisocyanate and 1,3-diisocyanatomethylcyclohexane (hydrogenated XDI); aliphatic diisocyanates having an aromatic ring such as xylylene diisocyanate (XDI) and tetramethylxylylene diisocyanate (TMXDI); modified products of these diisocyanates (as modified with carbodiimide, uretidione, uretonimine, and biuret and/or isocyanurate); and mixtures of at least two of these examples. Preferable among these are HDI, IPDI, hydrogenated MDI and TMXDI.

Use of an aromatic polyisocyanate as the component (a) is not desirable since the coating is then prone to yellow, and is also liable to discolor by being affected by ultraviolet rays.

Examples of useful high-molecular-weight polyols (b) are polyether polyols such as those obtained by subjecting an alkylene oxide (ethylene oxide, propylene oxide, butylene oxide or the like) and/or a heterocyclic ether (tetrahydrofuran or the like) to polymerization or copolymerization, and including, for example, polyethylene glycol, polypropylene glycol, polyethylene-polypropylene (block or random) glycol, polyethylene-tetramethylene glycol (block or random), polytetramethylene ether glycol and polyhexamethylene ether glycol; polyester polyols such as those obtained by subjecting an aliphatic dicarboxylic acid (succinic acid, adipic acid, sebacic acid, glutaric acid, azelaic acid or the like) and/or an aromatic dicarboxylic acid (isophthalic acid, terephthalic acid or the like), and a low-molecular-weight glycol (ethylene glycol, propylene glycol, 1,4-butanediol, 1,6-hexanediol, 3-methyl-1,5- pentanediol, neopentyl glycol, 1,4-dihydroxymethylcyclohexane or the like) to condensation polymerization, and including, for example, polyethylene adipate diol, polybutylene adipate diol, polyhexamethylene adipate diol, polyneopentyl adipate diol, polyethylene/butylene adipate diol, poly-3- methylpentane adipate diol and polybutylene isophthalate diol; polylactone polyols such as polycaprolactone diol or triol and poly-3-methylvalerolactone diol; polycarbonate diols such as polyhexamethylene carbonate diol; polyolefin polyols such as polybutadiene glycol or hydride thereof; and mixtures of at least two of such polyols. Among these high-molecular-weight polyols, preferable are polyester polyols, polylactone polyols, polycarbonate polyols and mixtures of such polyols, or mixtures of such a polyol and a polyether polyol. The high-molecular-weight polyol has a molecular weight usually of 500 to 5000, preferably 1000 to 3000.

The α,α-dimethylolmonocarboxylic acid (c) is a component used for introducing anionic hydrophilic groups into the composition to disperse the polyurethane resin in water with good stability. Examples of such acids are α,α-dimethylolacetic acid α,α-dimethylolpropionic acid, α,α-dimethylolbutyric acid and the like, among which α,α-dimethylolpropionic acid is desirable. The amount of the α,α-dimethylolmonocarboxylic acid is preferably 0.3 to 5 wt. %, more preferably 0.5 to 3 wt. %, calculated as carboxyl groups (—COOH), based on the urethane resin which is prepared by reacting the components (a) to (c). If the amount is less than 0.3 wt. %, it is difficult to obtain a stable emulsion, whereas amounts exceeding 5 wt. % render the polymer highly hydrophilic to give the emulsion a high viscosity, further entailing the likelihood that the coating obtained will have lower water resistance.

In preparing the component (B), the chain lengthening agent and/or polymerization terminator (d) may be used when required. Examples of useful chain lengthening agents are low-molecular-weight polyols and polyamines. Examples of useful low-molecular-weight polyols are glycols exemplified as materials for the aforementioned polyester polyols and alkeylene oxide low-mole adducts thereof (less than 500 in molecular weight); alkylene oxide low-mole adducts (less than 500 in molecular weight) of bisphenol; trihydric alcohols such as glycerin, trimethylolethane, trimethylolpropane and alkylene oxide low-mole adducts (less than 500 in molecular weight) of such alcohols; and mixtures of at least two of these polyols. Examples of useful polyamines are aliphatic polyamines such as ethylenediamine, N-hydroxyethylethylenediamine, tetramethylenediamine, hexamethylenediamine and diethylenetriamine; alicyclic polyamines such as 4,4'-diaminodicyclohexylmethane, 1,4-diaminocyclohexane and isophoronediamine; aliphatic polyamines having an aromatic ring, such as xylylenediamine and tetramethylxylylenediamine; aromatic polyamines such as 4,4'-diaminodiphenylmethane, tolylenediamine, benzidine and phenylenediamine; and mixtures of at least two of these polyamines. The amount of the chain lengthening agent is usually 0.3 to 30 wt. %, preferably 0.5 to 20 wt. %, based on the high-molecular-weight polyol (b).

Examples of polymerization terminators are low-molecular weight monohydric alcohols (methanol, butanol, cyclohexanol and the like), monovalent alkylamines (mono- and di-ethylamines, mono- and di-butylamines and the like), alkanolamines (mono- and di-ethanolamines and the like), etc.

Examples of primary and secondary monoamines (e) for use in neutralizing carboxyl groups are ammonia; lower alkylamines such as methylamine, ethylamine, isopropylamine, n-butylamine, dimethylamine, diethylamine, diisopropylamine and di-n-butylamine; alicyclic amines such as cyclohexylamine; hetetrocyclic amines such as morpholine and pyridine; alkanolamines such as monoethanolamine, diethanol amine, monoisopropanolamine, diisopropanolamine, methylethanolamine and methylisopropanolamine; and mixtures of at least two of such amines. Among these, preferable are secondary alkanolamines. The monoamine is used usually in an amount of 0.5 to 1.5 equivalents, preferably 0.7 to 1.3 equivalents, per equivalent of carboxyl.

The equivalent ratio of the component (a) to the components (b), (c) and (d) for use in the reaction for forming the polyurethane is usually 0.7 to 1.3, preferably 0.8 to 1.2.

The urethane resin emulsion (B) is prepared by reacting the components (a), (b) and (c), along with the component (d) when required, in the presence or absence of an organic solvent by the one-shot method or multistage method to form a carboxyl-containing polyurethane resin, admixing the resin with water after neutralization or while being neutralized with the monoamine (e) to obtain a dispersion, and distilling off the solvent when so required. The emulsion is an aqueous dispersion of self-emulsifiable polyurethane resin having a mean particle size of about 0.001 to about 1.0 $\mu$. The polyurethane forming reaction is conducted usually at a temperature of 20° to 150° C., preferably 50° to 120° C. In the case where an amine is reacted, the reaction is conducted at a temperature usually of up to 80° C., preferably 0° to 70° C. An amine or tin catalyst generally used for usual urethane forming reactions may be used to accelerate the reaction. When a solvent is used, especially preferable to use is one which is soluble in water and generally not higher than water in boiling point.

The primary and secondary monoamines (e) are useful also as neutralizing agents for the resin (A). Component (C): crosslinking agent This agent crosslinks the components (A) and/or (B) for curing. Suitable crosslinking agents are melamine resins for coating compositions and phenol formaldehyde resins. Although these resins can be water-soluble or hydrophobic, hydrophobic resins are preferable to achieve improved coating work efficiency, storage stability and moisture resistance.

Examples of suitable hydrophobic melamine resins are those having a solvent dilution ratio of up to 20, preferably up to 15, and an weight average molecular weight of 800 to 4000, preferably 1000 to 3000. The solvent dilution ratio is an index representing the solubility of the melamine resin in hydrophilic solvents; the lower the ratio, the higher is the hydrophobicity. The ratio is determined by placing a 5-c.c. beaker containing 2 g of melamine resin on a sheet of paper printed in No. 5 type, and then a solvent mixture of water/methanol (35/65 in weight ratio) is added dropwise to the resin at 25° C. with stirring until the printed impression becomes illegible, whereon the amount (c.c.) of mixture added is measured. The ratio is expressed in the value (c.c./g) obtained by dividing the measurement by the amount of melamine resin.

The melamine resin to be used is not limited specifically insofar as the resin has the above-specified solvent dilution ratio and molecular weight. Various etherified melamine resins are usable which include, for example, those modified with one or at least two of methyl alcohol, ethyl alcohol, isopropyl alcohol, n-butyl alcohol, isobutyl alcohol, octyl alcohol, 2-ethylhexyl alcohol, benzyl alcohol and the like. Suitable for use in the present invention are those modified with an alcohol having at least 4 carbon atoms, more preferably with a $C_4$ to $C_7$ alcohol. Although the amount of ether groups in the melamine resin is not limited specifically, it is suitable that the amount be up to about 5 moles, preferably about 1.5 to about 3 moles, per triazine ring. Further although the kind and amount of remaining functional groups such as amino, imino and methylol groups are not limited specifically insofar as the resin fulfils the above requirements as to the solvent dilution ratio and molecular weight, the preferred amount of imino groups (inclusive of amino groups), as well as methylol groups, is 0.2 to 2.0 moles, more preferably 0.5 to 1.5 moles, per triazine ring.

It is desired that the hydrophobic crosslinking agent be admixed with a water-soluble resin before being admixed with the components (A) and (B).

The water-soluble resin is a resin (such as acrylic resin, alkyd resin, epoxy resin or the like) having introduced therein a hydrophilic group such as carboxyl (—COOH), hydroxyl (—OH), methylol (—CH$_2$OH), amino (—NH$_2$), sulfon (—SO$_3$H) or polyoxyethylene bond (—(CH$_2$CH$_2$O)$_n$—). Most common such resins are those having carboxyl introduced therein, neutralized with the above-mentioned primary or secondary amine and thereby made soluble in water.

It is suitable that the water-soluble resin be admixed with the crosslinking agent usually in a ratio of about 20 to about 100 parts by weight, preferably about 28 to about 80 parts by weight, per 100 parts by weight of the agent, calculated as solids. These two components are mixed together by a desired method. For example, the two components are uniformly mixed together by a disper, homomixer, ball mill, sand mill or the like, with a coloring pigment, extender pigment, etc. kneaded with the components when so required. Further when needed, a small amount of hydrophilic solvent, such as alcohol or ether solvent, can be added to the mixture in this procedure. Next, while vigorously stirring the mixture, deionized water is slowly added thereto in about 0.5 to 5 times the combined amount by weight of the hydrophobic melamine resin and the water-soluble resin, whereby an aqueous dispersion of crosslinking agent is obtained in which the surfaces of melamine resin particles, which are milky white or colored, are covered with the water-soluble resin. When free from a pigment, the aqueous dispersion is about 0.05 to about 0.5 $\mu$ in mean particle size.

A metallic pigment and/or a coloring pigment generally used for coating compositions can be admixed with the aqueous coating composition of the invention. Examples of useful metallic pigments are aluminum flakes, copper bronze flakes, iron oxide resembling mica, mica flakes, iron oxide resembling mica and coated with a metal oxide, mica flakes coated with a metal oxide. Examples of useful coloring pigments are inorganic pigments such as titanium dioxide, iron oxide, chromium oxide, lead chromate and carbon black; and organic pigments such as Phthalocyanine Blue, Phthalocyanine Green, carbazole violet, anthrapyrimidine yellow, flavanthrone yellow, isoindoline yellow, Indanthrone Blue ane quinacridone violet.

With respect to the proportions of the components (A) to (C) of the aqueous coating composition of the invention, the ratio of the component (A)/the component (C) by weight is preferably in the range of 90/10 to 60/40. The ratio of the components (A)+(C)/component (B) by weight is preferably 95/5 to 60/40, more preferably 90/10 to 70/30, when the coating composition is to be applied to metal substrates, or is preferably 90/10 to 20/80, more preferably 80/20 to 30/70, for application to plastics.

The aqueous coating composition of the present invention is applied by the following coating method.

Suitable substrates are the external plates of motor vehicles, especially those of passenger vehicles, buses, trucks, motor cycles, etc., whereas there is no reason to limit the application only to these uses. These substrates may be made of metals or plastics. Metal substrates can be precoated with a primer or intermediate coating composition.

It is desired to adjust the present aqueous coating composition to a solids content of about 10 to about 40 wt. and to a viscosity of about 800 to about 5000 cps/6 r.p.m. (B-type viscometer) in the usual manner by adding to the composition deionized water, along with a thickener, defoaming agent, etc. as required.

The aqueous coating composition of the present invention can be used very suitably as a base coat composition by the two-coat one-bake method. More specifically, this method is practiced by applying the present composition to metal substrates to a thickness of about 10 to about 50 $\mu$ when dried as by air spraying, airless spraying or electrostatic coating, drying the coating with air or hot air to a volatile content of up to 25 wt. %, preferably up to about 15 wt. %, and subsequently applying a clear coating composition to the coating to a thickness of about 15 to about 70 $\mu$ when dried as by electrostatic spray coating, followed by usual setting. The combined coating thus formed is then heated at about 120° to about 160° C. for about 15 to about 60 minutes to obtain a cured coating. In this way, the substrate can be coated with a very high work efficiency easily to form an esthetic coating.

Further plastics substrates can be coated in the same manner as the metal substrate described above after having being degreased and coated with a primer or the like when so required. The base and clear coatings are cured at a temperature below the thermal deformation temperature of the plastics.

Although it is suitable to use the present aqueous coating composition as a base coat composition by the two-coat one-bake method as stated above, the present composition is also usable singly for coating.

The clear coat composition to be applied to the coating of the present aqueous coating composition can be one already known. Examples of such compositions are coating compositions of the organic solvent dilution type comprising an amino resin-alkyd resin type, acrylic resin type, amino resin-acrylic resin type, amino resin oil-free alkyd resin type, silicone polyester resin type, fluorocarbon resin type, urethane resin type or the like. Especially preferable as clear coating compositions from the viewpoint of environmental problems and savings in resources are those of the high-solid type having a high solids content and usable with a reduced amount of organic solvent. Powder coating compositions are also usable.

Especially preferable clear coating compositions of the high-solid type are those of the organic solvent thermosetting type consisting primarily of an acrylic resin, hexaalkoxymethylmelamine and acid catalyst.

The acrylic resin for use in these clear coating compositions of the high-solid type comprises a monoester of acrylic acid or methacrylic acid and a monohydric alcohol having 1 to 20 carbon atoms as main components, and, when required, a carboxyl-containing vinyl monomer or other vinyl monomer or the like, and is prepared by polymerizing these components. Preferably, the acrylic resin is about 1,000 to about 100,000 in number average molecular weight, 50 to 200 in hydroxyl value and 0 to 50 in acid value.

Furthermore, the acrylic resin can be modified with a reaction product of $\epsilon$-caprolactone and a hydroxyl-containing vinyl monomer or is usable in combination with a ring-opened polyester of $\epsilon$-caprolactone.

The hexaalkoxymethylmelamine is a crosslinking agent for the acrylic resin and is obtained by fully etherifying hexamethylolmelamine with a monohydric alcohol having 1 to 4 carbon atoms. It is required that the six methylol groups on the triazine ring be all alkyletherified. The alkyl groups on the ring may be the same or different. Examples of suitable alkyl groups are methyl, ethyl, n-butyl, isobutyl and the like.

The acid catalyst serves to accelerate the crosslinking reaction between the acrylic resin and the hexaalkoxymethylmelamine, and is, for example, dodecylbenzenesulfonic acid, p-toluenesulfonic acid, dinonylnaphthalenedisulfonic acid or the like. Also usable is such an acid as blocked with an amine.

The organic solvent serves to dissolve or disperse the above components, and is at least one of those used for coating compositions and selected, for example, from among hydrocarbon, alcohol, ester, ketone, ether and like solvents.

The proportions by weight of the acrylic resin and the hexaalkoxymethylmelamine for forming the high-solid clear coating composition if 45 to 85% of the former and 55 to 15% of the latter based on the combined amount of the two components. To be suitable, the amount of acid catalyst is 0.1 to 5 parts by weight per 100 parts by weight of the two components combined. When to be applied, the clear coating composition has a solids concentration which is preferably in the range of 40 to 65 wt. % although variable as desired depending on the substrate.

When required, the above-mentioned coloring pigment can be admixed with the components of the clear coating composition insofar as the transparency of the composition is not impaired. Also suitably usable are additives such as ultraviolet absorber, light stabilizer and surface leveling agent.

The present invention will be described in greater detail with reference to the following preparation examples, examples and comparative examples, in which parts and percentages are all by weight.

PREPARATION EXAMPLE 1

Emulsions (A-1) to (A-6) of the core/shell type were prepared by the steps (I) to (III) described below using the components listed in Table 1.

Step (I): Deionized water (120 parts) was placed into a flask and heated at 80° to 85° C. Two parts of the first pre-emulsion listed in Table 1 was added to the water with stirring, the mixture was aged for 20 minutes, and the remaining portion of the pre-emulsion was then added dropwise to the mixture at the same temperature at a constant rate over a period of 3 hours to obtain an aqueous dispersion of three-dimensionally crosslinked core portion.

Step (II): After the completion of dropwise addition of the first pre-emulsion, a silane monomer and allyl methacrylate were rapidly added dropwise to the dispersion, and the mixture was maintained at so to 85° C. for 1 hour to react the silane monomer and the allyl methaorylate to the surface of the core portion.

Step (III): Deionized water (50 parts) was admixed with the reaction mixture, and the second pre-emulsion listed in Table 1 was added dropwise to the resulting mixture at 80 to 85° C. at a constant rate over a period of 1 hour.

The mixture was maintained at the same temperature for 1 hour and then rapidly cooled to room temperature, and deiozed water was added to a solids content of 30%. The resulting polymer in the form of fine particles was insoluble in organic solvent. Deionized water was thereafter added to the mixture, and the mixture was neutralized with diethanolamine and adjusted to a solids content of 20%, affording an emulsion (A-1) of the core/shell type. The same steps as above was repeated to obtain like emulsions (A-2) to (A-6).

The terms marked with *1 to *4 in Table 1 means the following.

(*1) Pre-emulsion: A uniform emulsion prepared by treating the mixture of listed components by a high-speed stirrer.
(*2) The weight ratio based on the polymerizable monomers contained in each pre-emulsion.
(*3) Diethanolamine was used for neutralization.
(*4) Determined by laser correlation spectroscopy.

tor over a period of 4 hours using a metering pump. After the completion of the addition, the mixture was aged for 1 hour.

A monomer mixture (2) given below was further placed into the reactor at 80° C. over a period of 1.5 hours, followed by aging for 1 hour, and the mixture was filtered with 200-mesh nylong cloth at 30° C. Deionized water was further added to the filtrate, and the pH of the mixture was adjusted to 7.5 with diethanol amine to obtain a 20% aqueous dispersion (A-7) of acrylic resin, 46° C. in Tg.

| Monomer mixture (1) | |
|---|---|
| Methyl methacrylate | 55 parts |
| Styrene | 10 parts |
| n-Butyl acrylate | 9 parts |
| 2-Hydroxyethyl acrylate | 5 parts |
| Methacrylic acid | 1 part |
| Monomer mixture (2) | |
| Methyl methacrylate | 5 parts |
| n-Butyl acrylate | 7 parts |
| 2-Ethylhexyl acrylate | 5 parts |

TABLE 1

| Item | A-1 | A-2 | A-3 | A-4 | A-5 | A-6 |
|---|---|---|---|---|---|---|
| Step (I) | | | | | | |
| First pre-emulsion (*1) | | | | | | |
| γ-Methacryloxypropyltrimethoxysilane | 2 | 4 | | 2 | 4 | |
| Vinyltrimethoxysilane | | | 2 | | | 2 |
| Styrene | 20 | 20 | 20 | 20 | 20 | 20 |
| Methyl methacrylate | 20 | 23 | 25 | 23 | 20 | 23 |
| Butyl acrylate | 43 | 43 | 40 | 40 | 43 | 45 |
| Hydroxypropyl methacrylate | 15 | 10 | 13 | 15 | 13 | 10 |
| Polyoxyethylene nonylphenyl ether sulfate ammonium salt | 1.5 | 1.5 | 1.5 | 1.5 | 1.5 | 1.5 |
| Ammonium persulfate | 0.4 | 0.4 | 0.4 | 0.4 | 0.4 | 0.4 |
| Dionized water | 45 | 45 | 45 | 45 | 45 | 45 |
| Step (II) | | | | | | |
| γ-Methacryloxypropyltrimethoxysilane | 2 | 4 | | 2 | 2 | 2 |
| Vinyltrimethoxysilane | | | 12 | | | |
| Allyl methacrylate | 2 | 2 | 3 | 2 | 2 | 2 |
| Step (III) | | | | | | |
| Second pre-emulsion (*1) | | | | | | |
| Acrylic acid | 16 | | 18 | 16 | 16 | |
| Methacrylic acid | | 16 | | | | 20 |
| Styrene | 12 | 12 | 12 | 12 | 12 | 12 |
| Methyl methacrylate | 20 | 18 | 18 | 24 | 22 | 16 |
| Butyl acrylate | 44 | 44 | 40 | 40 | 40 | 40 |
| Hydroxyethyl acrylate | 8 | 10 | 12 | 8 | 10 | 12 |
| Polyoxyethylene nonylphenyl ether sulfate ammonium salt | 0.3 | 0.3 | 0.3 | 0.3 | 0.3 | 0.3 |
| Ammonium persulfate | 0.2 | 0.2 | 0.2 | 0.2 | 0.2 | 0.2 |
| Dionized water | 12 | 12 | 12 | 12 | 12 | 12 |
| First pre-emulsion/second pre-emulsion (monomer wt. ratio) (*2) | 80/20 | 80/20 | 80/20 | 70/30 | 80/20 | 90/10 |
| Before neutralization | | | | | | |
| Particle size (nm) (*4) | 121 | 131 | 130 | 110 | 135 | 103 |
| pH | 2.3 | 2.4 | 2.2 | 2.6 | 2.8 | 2.5 |
| After neutralization (*3) | | | | | | |
| Particle size (nm) (*4) | 124 | 132 | 135 | 118 | 138 | 110 |
| pH | 7.5 | 7.5 | 7.5 | 7.5 | 7.5 | 7.5 |

PREPARATION EXAMPLE 2

Into a reactor were placed 140 parts of deionized water, 2.5 parts of 30% Newcol 707SF and 1 part of monomer mixture (1) given below, which were mixed together by stirring in a nitrogen stream, and 3 parts of 3% ammonium persulate was added to the mixture at 60° C. The mixture was then heated to a temperature of 80° C., and a monomer emulsion comprising 79 parts of the monomer mixture (1), 2.5 parts of 30% Newcol 707SF, 4 parts of 3% ammonium persulfate and 42 parts of deionized water was thereafter placed into the reac-

| Methacrylic acid | 3 parts |
|---|---|
| 30% Newcol 707SF | 0.5 part |
| 3% Aqueous solution of ammonium persulfate | 4 parts |
| Deionized water | 30 parts |

PREPARATION EXAMPLE 3

Into a reactor were added 60 parts of butyl and 15 parts of isobutyl alcohol, and the mixture was heated to 115° C. in a nitrogen stream. To the mixture heated to 115° C. was then added over a period of 3 hours a mixture of 26 parts of n-butyl acrylate, 47 parts of methyl methacrylate, 10 parts of styrene, 10 parts of 2-hydroxyethyl methacrylate, 6 parts of acrylic acid and 1 part of azoisobutyronitrile. The resulting mixture was thereafter aged at 115° C. for 30 minutes, and a mixture of 1 part of azobisisobutyronitrile and 115 parts of butyl cellosolve was added to the aged mixture over a period of 1 hour, followed by aging for 30 minutes and thereafter by filtration with 200-mesh nylon cloth at 50° C.

The reaction product obtained was 48 in acid value, $Z_4$ in viscosity (Gardner bubble viscometer), 55% in nonvolatile content and 45° C. in Tg. The product was neutralized with an equivalent quantity of diethanolamine, followed by addition of deionized water, to obtain a 50% aqueous solution (A-8) of acrylic resin.

PREPARATION EXAMPLE 4

Into a pressure reactor were added 88.2 parts of polycaprolactone diol (2000 in molecular weight), 88.2 parts of poly-3-methylpentane adipate diol (2000 in molecular weight), 6.2 parts of 1,4-butanediol, 4.8 parts of trimethylolpropane, 10.0 parts of dimethylolpropionic acid, 78.6 parts of IPDI and 120 parts of acetone, which were then reacted at 85° C. under an increased pressure for 5 hours. The reaction mixture was thereafter reacted with 6.0 parts of 1,4-butanediol and 150 parts of acetone for 3 hours at the same temperature. Subsequently, the resulting reaction mixture was cooled to 40° C., neutralized with 8.8 parts of diethanolamine and then admixed with 700 parts of ion-exchanged water. The acetone was distilled off from the mixture in a vacuum at a temperature of up to 70° C., giving 949 parts of a urethane resin emulsion (B-1) 31.6% in solids content, 250 cps/25° C. in viscosity and 9.4 in pH.

PREPARATION EXAMPLE 5

Into a pressure reactor were placed 69.6 parts of polycarbonate diol (2000 in molecular weight), 69.6 parts of poly-3-methylpentane adipate diol (2000 in molecular weight), 2.6 parts of trimethylolpropane, 37.7 parts of ethylene oxide 2-mole adduct (330 in molecular weight) of bisphenol A, 8.6 parts of dimethylolpropionic acid, 92.0 parts of IPDI and 120 parts of acetone, which were then reacted at 85° C. for 5 hours to obtain a prepolymer solution having a terminal NCO content of 2.68%. The solution was subsequently cooled to 35° C., and a mixture of 8.3 parts of aminoethylethanolamine, 30 parts of isopropanol and 120 parts of acetone was reacted with the solution for 1 hour. The reaction mixture was then admixed with 700 parts of ion-exchanged water containing 15.0 parts of diethanolamine, followed by removal of the solvent in the same manner as in Preparation Example 4, whereby 997 parts of a urethane resin emulsion (B-2) was obtained which was 30.1% in solids content 350 cps/25° C. in viscosity and 9.4 in pH.

PREPARATION EXAMPLE 6

A mixture of 7.9 parts of aminoethylethanolamine, 30 parts of isopropanol and 120 parts of acetone was added to a prepolymer solution (NCO% 2.72) prepared from 66.1 parts of polyethylene isophthalate diol (2000 in molecular weight), 66.1 parts of neopentyl adipate diol (2000 in molecular weight), 2.5 parts of trimethylolpropane, 38.8 parts of ethylene oxide 2-mole adduct of bisphenol A, 8.2 parts of dimethylolpropionic acid, 1o2.0 parts of hydrogenated MDI and 120 parts of acetone, followed by reaction at 30° C. for 1 hour. The reaction mixture was neutralized with 14.3 parts of diethanolamine and thereafter admixed with 700 parts of ion-exchanged water. The same procedure as in Preparation Example 4 was thereafter followed to obtain 990 parts of a urethane resin emulsion (B-3), 30.3% in solids content, 150 cps/25° C. in viscosity and 9.2 in pH.

PREPARATION EXAMPLE 7

Into a stirring container were placed 41.7 parts of a hydrophobic melamine resin, i.e., "UBAN 28SE" (product of Mitsui Toatsu Chemicals Inc., 60% in nonvolatile content, 0.4 in solvent dilution ratio), and 20 parts of the acrylic resin aqueous solution (A-8) prepared in Preparation Example 3. While stirring the mixture by a disper at 1000 to 1500 r.p.m., 80 parts of deionized water was slowly added to the mixture, followed by stirring further for 30 minutes to obtain a crosslinking agent (C-1) in the form of an aqueous dispersion with a mean particle size of 0.11 $\mu$.

PREPARATION EXAMPLE 8

Into a stirring container were placed 23 parts of aluminum paste (65% in metal content) and 25 parts of butyl cellosolve, followed by stirring for 1 hour to obtain an aluminum pigment concentrate (P-I).

PREPARATION EXAMPLE 9

(i) Preparation of Acrylic Resin (1)

Into a reactor was placed 40 parts of cellosolve acetate, which was stirred with heating to 185° C., whereupon the following monomer mixture was placed into the reactor over a period of 8 hours.

| | |
|---|---|
| Styrene | 10 parts |
| Isobutyl methacrylate | 80 parts |
| n-Butyl methacrylate | 12 parts |
| 2-Ethylhexyl methacrylate | 20 parts |
| 2-Hydroxyethyl methacrylate | 25 parts |
| Methacrylic acid | 8 parts |
| Cellosolve acetate | 50 parts |
| α,α-Azobisisobutyronitrile | 4 parts |

The reaction was continued further for 1 hour after the addition of the monomer mixture at the same temperature of 185° C., and a mixture of 10 parts of cellosolve acetate and 0.6 part of α,α-azobisisobutyronitrile was thereafter added to the reaction mixture over a period of 2 hours and 20 minutes, followed by reaction for 2 hours and further by distillation in a vacuum for the removal of the cellosolve acetate to adjust the resulting solution to a resin concentration of 65% and obtain an acrylic resin solution (1). The resin component of the solution (1) was 4,800 in number average molecular weight.

(ii) Preparation of Acrylic Resin Nonaqueous Dispersion

Into a reactor were placed 35 parts of Cymel 235 (product of Mitsui Cyanamid, hexaalkoxy(methoxy/butoxy mixture) methylmelamine), 103 parts of n-heptane and 0.15 part of benzoyl peroxide, which were heated to 95° C. The following monomer mixture was added dropwise to the mixture over a period of 8 hours.

| | |
|---|---|
| Styrene | 15 parts |

-continued

| | |
|---|---|
| Acrylonitrile | 9 parts |
| Methyl methacrylate | 13 parts |
| Methyl acrylate | 15 parts |
| n-Butyl methacrylate | 1.8 parts |
| 2-Hydroxyethyl methacrylate | 10 parts |
| Acrylic acid | 1.2 parts |
| Benzoyl peroxide | 0.5 part |
| n-Butanol | 5 parts |
| Shellsol 140 (product of Shell Oil, hydrocarbon solvent) | 30 parts |
| n-Heptane | 9 parts |

One hour after the addition of the monomer mixture, a mixture of 0.65 part of tert-butyl peroctoate and 3.6 parts of Shellsol 140 was added to the reaction mixture over a period of 1 hour, followed by continued stirring at the same temperature of 95° C. for 2 hours. Thereafter 34 parts of the solvent was distilled off in a vacuum to obtain an acrylic resin nonaqueous dispersion having a resin content of 60% and varnish viscosity A (Gardner bubble viscometer).

(iii) Preparation of Acrylic Resin (2)

An acrylic resin solution (2) having a number average molecular weight of 4600 and a resin solids content of 50% was prepared by reacting 30 parts of styrene, 40 parts of n-butyl methacrylate, 10 parts of 2-ethylhexyl acrylate, 18 parts of 2-hydroxyethyl acrylate and 2 parts of acrylic acid in an organic solvent mixture of 85 parts of xylol and 15 parts of n-butanol.

(iv) Preparation of Acrylic Resin (3)

Into a reactor were placed 30 Swasol-1000 (aromatic hydrocarbon solvent manufactured by Cosmo Oil Co., Ltd.), 20 parts of xylol and 15 parts of n-butanol, which were then heated to 13° C. with stirring, whereupon the following monomer mixture was added to the above mixture over a period of 3 hours.

| | |
|---|---|
| Styrene | 20 parts |
| n-Butyl methacrylate | 22 parts |
| n-Butyl acrylate | 20 parts |
| 2-Hydroxyethyl acrylate | 16 parts |
| TONE M-100[1)] | 20 parts |
| Acrylic acid | 2 parts |
| α,α-Azobisisobutyronitrile | 2.2 parts |

After the completion of addition of the above monomer mixture, the resulting mixture was maintained at 130° C. further for 1 hour, followed by the addition of a mixture of 1 part of tert-butyl peroctoate and 10 parts of xylol over a period of 1 hour and thereafter by continued stirring at 130° C. for 2 hours. The mixture was then cooled, and xylol was added thereto to obtain an acrylic resin solution (3) having a solids concentration of 50 wt. %. The acrylic resin was 7500 in number average molecular weight (Mw) and 110 in hydroxyl value.

1) TONE M-100: Brand name of Union Carbide (U.S.) for a monomer which is an adduct of 1 mole of 2-hydroxyethyl acrylate with 2 moles of ε-caprolactone.

Clear coating compositions (T-1) to (T-3) of the high-solid type each comprising the components listed in Table 2 were prepared using the acrylic resins (1) to (3) and acrylic resin nonaqueous dispersion obtained by the procedures (i) to (iv) above.

TABLE 2

| | Acrylic resin (parts) | Alkoxy-melamine (parts) | Acid Catalyst (part) | Solids content (%) |
|---|---|---|---|---|
| T-1 | (1) 77 Nonaqueous dispersion 50 | M-1 20 | CAT-1 0.5 | 55 |
| T-2 | (2) 150 | M-2 25 | CAT-2 0.5 | 55 |
| T-3 | (3) 140 | M-3 30 | CAT-3 0.5 | 55 |

The alkoxymelamines and the acid catalysts given in Table 2 are as follows.

Alkoxymelamines

M-1: Cymel 303 (hexamethoxymethylmelamine manufactured by Mitsui Cyanamide Co., Ltd.)

M-2 Cymel 235 (methoxy/butoxy fully etherified monomeric melamine by manufactured by Mitsui Cyanamide Co., Ltd.)

Acid Catalysts

CAT-1: Catalyst 6000 (dodecylbenzenesulfonic acid manufactured by Mitsui Toatsu Chemicals Inc.)

CAT-2: Nacure 5225 (amine block of dodecylbenzene-sulfonic acid manufactured by King Industries (U.S.))

CAT-3: Nacure 2500 (amine block of p-toluenesulfonic acid manufactured by King Industries (U.S.))

EXAMPLE 1-9 AND COMPARATIVE EXAMPLES 1-3

Aqueous coating compositions were prepared each by mixing together some of the components obtained in Preparation Examples 1 to 8 in the proportions listed in Table 3 and adding "Acrysol ASE-60" (thickener manufactured by Rohm & Haas Co.) and diethanolamine to the mixture to adjust the mixture to an apparent viscosity of 3000 cps/6 r.p.m. (B-type Viscometer) and a pH of 7.80.

The amounts listed in Table 3 are each the amount of solids.

Although the component (C-1) includes the component (A-8), the amount of component (C) given in the table is the amount of hydrophobic melamine resin only, and the amount of component (A-8) is included in that of the component (A). Accordingly, the amount in the column of the component (A) is the sum of the amount of (A-8) included in the component (C-1) and the amount of the particular component (A) mentioned in the column. Thus, the amount of component (A) is the sum minus the amount of component (A-8).

The components (B-I)', (B-2)' and (B-3)' given for Comparative Examples are triethylamine as used in place of, and in the same equivalent amount as, the primary or secondary amine used for the respective components (B-1), (B-2) and (B-3).

TABLE 3

| | Component (A) | | Component (B) | | Component (C) | | Component |
|---|---|---|---|---|---|---|---|
| | Kind | Amount (parts) | Kind | Amount (parts) | Kind | Amount (parts) | (P-1) (parts) |
| Example | | | | | | | |

TABLE 3-continued

|   | Component (A) | | Component (B) | | Component (C) | | Component (P-1) (parts) |
|---|---|---|---|---|---|---|---|
|   | Kind | Amount (parts) | Kind | Amount (parts) | Kind | Amount (parts) | |
| 1 | (A-1) | 80 | (B-1) | 17 | (C-1) | 20 | 15 |
| 2 | (A-2) | 80 | (B-1) | 33 | (C-1) | 20 | 15 |
| 3 | (A-3) | 75 | (B-2) | 17 | (C-1) | 25 | 15 |
| 4 | (A-4) | 75 | (B-2) | 33 | (C-1) | 25 | 15 |
| 5 | (A-5) | 70 | (B-3) | 17 | (C-1) | 30 | 15 |
| 6 | (A-6) | 70 | (B-3) | 33 | (C-1) | 30 | 15 |
| 7 | (A-7) | 60 | (B-1) | 25 | (C-1) | 20 | 15 |
|   | (A-8) | 20 | | | | | |
| 8 | (A-7) | 55 | (B-2) | 25 | (C-1) | 25 | 15 |
|   | (A-8) | 20 | | | | | |
| 9 | (A-7) | 55 | (B-3) | 25 | (C-1) | 30 | 15 |
|   | (A-8) | 15 | | | | | |
| Comp. Ex. | | | | | | | |
| 1 | (A-1) | 80 | (B-1)' | 17 | (C-1) | 20 | 15 |
| 2 | (A-3) | 75 | (B-2)' | 17 | (C-1) | 25 | 15 |
| 3 | (A-5) | 70 | (B-3)' | 17 | (C-1) | 30 | 15 |

COATING METHOD

Steel panel substrates were coated by the two-coat one-bake method as described below using the aqueous coating compositions (for base coats) prepared in Examples 1 to 9 and Comparative Examples 1 to 3 and the clear coating composition of the high-solid type obtained in Preparation Example 9.

Each of the substrates was prepared by surface-treating a steel panel with "Bonderite #3030" (zinc phosphate treating agent, product of Nihon Parkerizing Co., Ltd.), electrophoretically coating the panel with a primer, i.e., "Elecron No. 9200" (epoxy resin cationic electrophoretic coating composition manufactured by Kansai Paint Co., Ltd.) and applying "Amilac N-2 sealer" (aminopolyester resin intermediate coating composition manufactured by Kansai Paint Co., Ltd.) to the coating.

The base coating composition was applied twice to the substrate in an environment having a temperature of 25° C. and a relative humidity of 65% by spray coating with a spray gun with an interval of 2 minutes provided between the two procedures for setting. The spray gun was used at an air pressure of 5 kg/cm$^2$ and a composition flow rate of 350 ml/min at a distance of 35 cm from the substrate. The substrate was held in a vertical position during the entire coating operation. After the second application of the composition, the coated substrate was allowed to stand in the same environment for 2 minutes, then dried in air at a temperature of 80° C. for 10 minutes and cooled to room temperature. The substrate was thereafter coated with the clear coating composition obtained in Preparation Example 9 using an electrostatic gun, followed by setting for 5 minutes and baking at 120 to 140° C. for 30 minutes. The base coating composition and the clear coating composition were applied to thicknesses of 15 μm and 40 μm, respectively, calculated as dry coatings. In this way, all the substrates were coated by the two-coat one-bake method.

The base coating compositions and the coatings formed were tested for the following properties (1) to (12). Table 4 shows the results.

(1) Sag

A cavity, 10 mm in diameter, was formed in the substrate, which was then coated and checked for the sagging of the composition. The mark C represents 0- to 2-mm sag, the mark Δ 2- to 4-mm sag, and the mark X 4- to 6-mm sag.

(2) Irregularities

The coating was checked for surface irregularities. The mark O represents almost no irregularity, the mark Δ some slight irregularities, and the mark x marked irregularities.

(3) Chipping Resistance

Determined using a Gravelometer tester ("Model JA-400," product of Suga Shikenki Co., Ltd.). The coated test panel was attached vertically to the sample holder of the tester, and 50 g of No. 7 crushed stones were pneumatically forced out at an air pressure of 4kg/cm$^2$ by pressure means on the tester against the test panel perpendicular thereto. The test panel was thereafter washed with water and dried, the coating portions raised by chipping were removed with an adhesive tape, and the coating was then checked for peel flaws according to the following criteria.

| Criteria | Size of scales of overcoat | Number of scales in area of 3 cm square |
|---|---|---|
| 1 | Overcoat was free from scaling but had some flaws. | |
| 2 | Up to 0.5 mm | Up to 10 |
| 3 | 0.5–1.0 mm | 20–40 |
| 4 | 1.0–2.0 mm | 30–60 |
| 5 | 1.5–3.0 mm | 50–80 |

Before the chipping resistance test, the test panel was immersed in dry ice/methanol cooled to −25° C. for 5 minutes to 10 minutes, whereupon the panel was withdrawn and tested immediately (within several seconds). The test panel had a temperature of −20°±5° C. during the testing.

(4) Humidity Resistance

The coated test panel was allowed to stand for 240 hours in a chamber maintained at a relative humidity of 98% and a temperature of 49°±1° C. using a humidity tester (Suga Shikenki Co., Ltd.).

Water drops were wiped off immediately after the test panel was withdrawn from the chamber, and the overcoat was checked for blisters, shrinkage and other faults. The mark O indicates that the humidity test produced no change in the coating. The mark Δ indicates some blisters, shrinkage or other faults.

(5) Impact Resistance

Using a Du Pont impact tester, a 500-gram weight with a tip radius of ½ inch was dropped onto the coated panel to determine the maximum distance (cm) of fall which caused no cracking in the coating. The resistance is expressed in terms of this distance.

(6) Weather Resistance

Determined by QUV accelerated exposure test using an accelerated weathering tester, product of Q Panel Co., Ltd.
The coated panel was tested under the conditions of:
irradiation with UV rays 16 h/60° C.
condensation of water 9 h/50° C.
as one cycle for 3600 hours (150 cycles), and the coating was thereafter checked. The mark O indicates that the coating remained almost unchanged in gloss, the mark Δ represents a reduction in gloss but none of defects such as cracks and chalking, and the mark X represents a marked reduction in gloss, cracks and chalking, hence a reject.

(7) Solvent Resistance

The coating on the coated panel was forcibly rubbed reciprocatingly 20 times with gauze wetted with xylol and pressed against the panel with the finger. The result was evaluated according to the three criteria of good, fair and poor, respectively represented by O, Δ and X, depending on the degree of melting or swelling of the coating and flaws therein.

(8) Water Resistance

The coated panel was immersed in water at 40° C. for 10 days, and the coating was thereafter checked. No change is represented by O, slight blistering by Δ, and marked blistering by X.

(9) Interlayer Adhesion

Approximately in the center of the coated panel, eleven parallel cut lines were formed at a spacing of 1 mm both vertically and horizontally in the coating to the surface of the substrate using a cutter knife to form 100 squares within an area of 1 cm². An adhesive cellophane tape was then affixed to the cross-cut coating and subsequently peeled off quickly, and the cross-cut area was checked. No separation of the coating is represented by C, slightly noticeable separation between the metallic coating and the clear coating by Δ, and marked interlayer separation by X.

(10) Distinctness-of-Image Gloss

Measured by an image clarity meter (product of Suga Shikenki Co., Ltd.). The figures in the table are ICM values in the range of 0 to 100%. The greater the numerical value, the better is the distinctness-of-image gloss. ICM values of not lower than 80 represent excellent distinctness-of-image gloss.

(11) Smoothness

Determined with the unaided eye.

(12) Metallic Appearance

Determined with the unaided eye.

TABLE 4

| Clear coating composition Properties | Example | | | | | | | | | Comp. Ex. | | |
|---|---|---|---|---|---|---|---|---|---|---|---|---|
| | 1 | 2 | 3 | 4 | 5 | 6 | 7 | 8 | 9 | 1 | 2 | 3 |
| | T-1 | T-2 | T-3 | T-1 | T-2 | T-3 | T-1 | T-2 | T-3 | T-1 | T-2 | T-3 |
| (1) | O | O | O | O | O | O | O | O | O | Δ | Δ | Δ |
| (2) | O | O | O | O | O | O | O | O | O | O | O | O |
| (3) | 1 | 1 | 1 | 1 | 1 | 1 | 1 | 1 | 1 | 2 | 2 | 2 |
| (4) | O | O | O | O | O | O | O | O | O | Δ | Δ | Δ |
| (5) | 35 | 35 | 35 | 35 | 35 | 35 | 35 | 35 | 35 | 25 | 25 | 25 |
| (6) | O | O | O | O | O | O | O | O | O | Δ | Δ | Δ |
| (7) | O | O | O | O | O | O | O | O | O | X | X | X |
| (8) | O | O | O | O | O | O | O | O | O | Δ | Δ | Δ |
| (9) | O | O | O | O | O | O | O | O | O | Δ | Δ | Δ |
| (10) | 89 | 88 | 88 | 90 | 88 | 89 | 90 | 90 | 88 | 78 | 76 | 77 |
| (11) | Good | Good | Good | Good | Good | Good | Good | Good | Good | Poor | Poor | Poor |
| (12) | Good | Good | Good | Good | Good | Good | Good | Good | Good | Poor | Poor | Poor |

We claim:

1. An aqueous coating composition characterized in that the composition consists essentially of:
   (a) a resin for use in aqueous coating compositions which is selected from the group consisting of hydroxyl- or carboxyl-containing acrylic resins, alkyd resins, epoxy resins and fluorine-containing resins,
   (B) a urethane resin emulsion, and
   (C) crosslinking agent,
   the component (B) being an aqueous dispersion of a polyurethane resin prepared by reacting (a) an aliphatic polyisocyanate and/or an alicyclic polyisocyanate, (b) a high-molecular-weight polyol, (c) an αα-dimethylolmonocarboxylic acid, and when required, (d) a chain lengthening agent and/or a polymerization terminator, and subsequently neutralizing the carboxyl with (e) a primary monoamine and/or a secondary monoamine.

2. An aqueous coating composition as defined in claim 1 wherein the resin (A) is an acrylic resin.

* * * * *